United States Patent
Mrusek et al.

(10) Patent No.: US 9,323,341 B2
(45) Date of Patent: Apr. 26, 2016

(54) METHOD AND DEVICE FOR DETERMINING GESTURES IN THE BEAM REGION OF A PROJECTOR

(71) Applicants: Georg Mrusek, Reutlingen (DE); Tobias Hipp, Hechingen (DE); Reiner Schnitzer, Reutlingen (DE); Frank Fischer, Gomaringen (DE); Lutz Rauscher, Reutlingen (DE); Christoph Delfs, Bretten (DE); Ming Liu, Reutlingen (DE); Gael Pilard, Wankheim (DE)

(72) Inventors: Georg Mrusek, Reutlingen (DE); Tobias Hipp, Hechingen (DE); Reiner Schnitzer, Reutlingen (DE); Frank Fischer, Gomaringen (DE); Lutz Rauscher, Reutlingen (DE); Christoph Delfs, Bretten (DE); Ming Liu, Reutlingen (DE); Gael Pilard, Wankheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/311,676

(22) Filed: Jun. 23, 2014

(65) Prior Publication Data

US 2014/0375553 A1 Dec. 25, 2014

(30) Foreign Application Priority Data

Jun. 24, 2013 (DE) .................. 10 2013 211 904

(51) Int. Cl.
*G06F 3/041* (2006.01)
*G06F 3/01* (2006.01)

(52) U.S. Cl.
CPC ..................... *G06F 3/017* (2013.01)

(58) Field of Classification Search
CPC ..... G06F 3/042; G06F 3/0421; G06F 3/0423; G06F 3/0425; G06F 3/0428; G06F 3/0484; G06F 3/04842
USPC ................................... 345/173–179
See application file for complete search history.

(56) References Cited

U.S. PATENT DOCUMENTS

| | | | | |
|---|---|---|---|---|
| 6,346,933 | B1 * | 2/2002 | Lin ............................... | 345/157 |
| 2006/0192782 | A1 * | 8/2006 | Hildreth ................... | A63F 13/00 |
| | | | | 345/473 |
| 2011/0096031 | A1 * | 4/2011 | Nakanishi ............. | G06F 3/0425 |
| | | | | 345/175 |
| 2011/0127788 | A1 * | 6/2011 | Nakanishi .......... | G01D 5/34715 |
| | | | | 294/110.1 |
| 2011/0134080 | A1 * | 6/2011 | Kiyose .......................... | 345/175 |

(Continued)

FOREIGN PATENT DOCUMENTS

EP 2 428 810 3/2012

*Primary Examiner* — Alexander Eisen
*Assistant Examiner* — Nelson Lam
(74) *Attorney, Agent, or Firm* — Kenyon & Kenyon LLP (57) ABSTRACT

A method for determining gestures in the beam region of a projector includes: projecting an image onto a surface with the aid of the projector, using light; measuring a first set of light intensities of light backscattered from the direction of the surface, under the influence of a gesture made in the beam region of the projector; assigning the measured light intensities to, in each instance, a position of the image projected by the projector; at a first time point, generating a first light intensity function over a second set of positions, which are assigned measured light intensities; at a second time point, generating at least one second light intensity function over the second set of positions; and determining the gesture made, based on the result of a comparison between the first and second light intensity functions.

14 Claims, 7 Drawing Sheets

(56) References Cited

U.S. PATENT DOCUMENTS

| | | | |
|---|---|---|---|
| 2011/0267315 A1* | 11/2011 | Nakanishi et al. | 345/175 |
| 2011/0304589 A1* | 12/2011 | Yoshida | 345/175 |
| 2012/0200538 A1* | 8/2012 | Christiansson et al. | 345/175 |
| 2013/0063401 A1* | 3/2013 | Ouchida | H04N 9/3179 345/175 |
| 2013/0142383 A1* | 6/2013 | Viswanathan | G06F 1/1684 382/103 |
| 2014/0253511 A1* | 9/2014 | Yagishita | G06F 3/0425 345/175 |
| 2014/0375553 A1* | 12/2014 | Mrusek et al. | 345/156 |

\* cited by examiner

METHOD AND DEVICE FOR DETERMINING GESTURES IN THE BEAM REGION OF A PROJECTOR

BACKGROUND OF THE INVENTION

1. Field of the Invention

The present invention relates to a method and a device for determining gestures in the beam region of a projector.

2. Description of the Related Art

Miniaturized projectors may be built into cellular phones, tablet PC's and other mobile terminals. Projectors are normally controlled using special remote controls, or by pressing keys on a computer keyboard. To control a projector, for example, in a cellular phone, it may be advantageous for a control option independent of additional devices to be available.

Published European patent application EP 2 428 810 A1 describes a method for gesture control of a projector in a cellular phone, according to which the user makes gestures in front of a video camera of the cellular phone, which are analyzed and used for controlling the projector.

BRIEF SUMMARY OF THE INVENTION

According to the present invention, a method for determining gestures in the beam region of a projector is provided, the method including the following method steps: projecting an image onto a surface by light, using the projector; measuring a first plurality of light intensities of backscattered light from the direction of the surface of backscattered light, under the influence of a gesture made in the beam region of the projector; assigning the measured light intensities to, in each instance, a position of the image projected by the projector; at a first time, generating a first light intensity function over a second plurality of positions, which are assigned measured light intensities; at a second time, generating at least one second light intensity function over the second plurality of positions; comparing the first light intensity function to the second light intensity function; and determining the gesture made, based on the result of the comparison.

Further provided is a device for determining gestures in the beam region of a projector, including: a projector device, by which an image may be projected, using light; a detector, which is configured to measure light intensities of backscattered light from the direction of a surface onto which the projector projects an image, under the influence of a gesture made in the beam region of the projector, using an object; a computing device, which is connected to the detector and configured to assign the measured light intensities to, in each instance, a position on the image projected by the projector, to generate light intensity functions over positions which are assigned measured light intensities, to compare generated light intensity functions to each other, and to determine a made gesture based on the result of the comparison.

The finding forming the basis of the present invention is that in order to recognize a gesture in the beam region of a projector, it may be sufficient to examine light intensity functions along some positions of the projected image. In this manner, there is a comparatively modest requirement for computing and storage capacity, as well as low demands on the technical elements of a device for executing the method.

The method uses components of the projector with the aid of a detector, which may be designed so simply, that it would not render any gesture recognition function possible without the projector. The light intensities may be measured with high precision and in view of plausibility criteria. In the method of the present invention, a projector may additionally be situated at a location difficult to access, since the control by way of gestures in the beam region of the projector takes place directly at the projector, instead of via a control unit. The control may also be carried out by several persons.

According to a preferred further refinement, the assigning is carried out in that, at each time at which a light intensity is measured, an information item regarding the part of the image the projector projected at this time is provided, and the measured light intensity is assigned to the position of this part of the image. Such information items are, for example, particularly simple to provide if the projector has a laser scanner, since a laser scanner covers an image to be projected, step by step. Consequently, a photodiode may be used, for example, to measure light intensities. Alternatively, however, a light sensor, which resolves in an extremely locationally precise manner and, for example, only measures, in each instance, light intensities in a small solid angle, may be used, whereupon the measured light intensity is assigned to this solid angle, that is, to the position of the image that is projected in this solid angle.

According to a further preferred embodiment, the measuring and the assigning are only carried out, if the positions, to which the measured intensities are assigned, are situated on the projected image in a horizontal and/or vertical margin of the projected image. In this manner, the necessary computing expenditure and storage requirement may be reduced. The horizontal and/or the vertical image margin may be between one and one hundred pixels, preferably, between one and ten pixels, and particularly preferably, one or two pixels wide. Each individual horizontal and/or vertical image margin may differ from the other image margins in its width.

According to a further preferred embodiment, a predefined test pattern, in particular, a test pattern taking the form of a uniform color or of infrared light, is projected in the horizontal and/or vertical image margin. This allows changing light intensities to be measured more accurately. If the projector projects unchanged image displays at the horizontal and/or vertical image margin, measured light intensities may be corrected by corresponding light intensities of the image displays.

According to a further preferred embodiment, the method includes the steps: determining prominent points in the first light intensity function and prominent points in the second light intensity function; associating at least one prominent point in the first light intensity function with, in each instance, a prominent point in the second light intensity function; and generating gesture data, which include information about the spatial position of the prominent points associated with one another and/or about a change in an average value of the light intensity between the prominent points.

According to a further preferred embodiment, points in the light intensity functions, at which and/or in the vicinity of which the slope of the light intensity function exceeds a predefined upper slope threshold value or falls below a predefined lower slope threshold value, are determined to be prominent points. In this manner, it may be ensured that only gestures actually intended are also determined to be such.

According to a further preferred embodiment, the gesture is made by a human hand. Consequently, the method is particularly simple to implement.

According to a further preferred embodiment, the method additionally includes the method steps: making a gesture to control the projector; and controlling the projector, using the determined, made gesture. Thus, a projector may be controlled, for example, so as to enlarge an image or to project a different image display, for instance, the next in a given series of image displays. Alternatively, a connected computer or another device may also be controlled according to the gesture. If the projector takes the form of a cellular phone, functions of the cellular phone may also be controlled according to the determined gesture.

According to a further preferred embodiment, the gesture is made in a space between a first distance d1 from the projector and a second distance d2 from the projector; second distance d2 being greater than first distance d1; and second distance d2 being less than 75% of a third distance d3 between the projector and the projection surface; and first distance d1 preferably being in a range between 5 cm and 25 cm; and second distance d2 preferably being in a range between 30 cm and 100 cm.

According to a preferred embodiment of the device, the projector device takes the form of a laser scanner. Laser scanners are small, energy-efficient and generate intense colors. In addition, as described above, laser scanners facilitate the assigning of light intensities to positions of the image, by projecting image 10 in steps.

According to a further preferred embodiment, the projector takes the form of a cellular phone and/or tablet PC. Consequently, a data source for the projector, and the projector, are integrated in a mobile housing, which renders use simple and user-friendly.

DETAILED DESCRIPTION OF THE INVENTION

Unless indicated otherwise, identical or functionally equivalent elements and devices have been provided with the same reference numerals in all of the figures. Although some method steps are provided with reference characters, which include numerals, no order is set by them. In particular, several method steps may also be carried out simultaneously.

Figure 1:
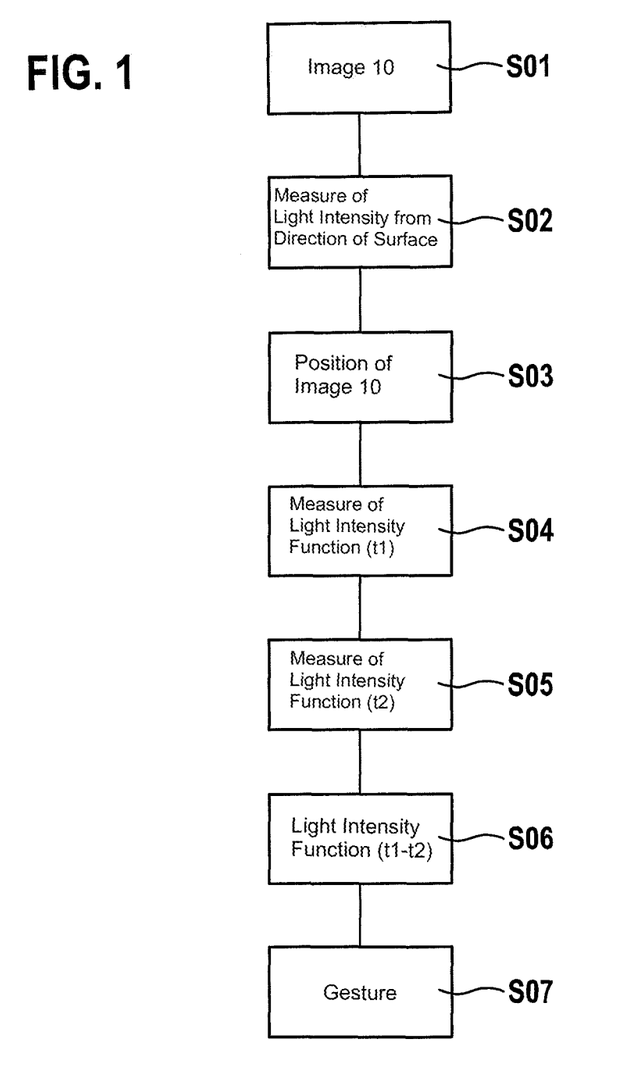
FIG. 1 shows a flow chart for explaining a method according to a first specific embodiment of the present invention.

FIG. 1 shows a flow chart for explaining a method according to a first specific embodiment of the present invention. In this context, reference is made to reference characters in FIGS. 2 through 7.

In a method step S01, an image 10 is projected onto a surface 2 with the aid of a projector 1. In a method step S02, a first plurality of light intensities of light backscattered from the direction of surface 2 is measured. In this context, light is also backscattered under the influence of a gesture made in beam region 3 of projector 1. In a method step S03, the measured light intensities are each assigned to a position of the image 10 projected by projector 1.

According to a first specific embodiment, projector 1 is a laser scanner. In a laser scanner, micromirrors in the interior of the laser scanner may be controlled in such a manner, that a laser beam covers positions in the interior of beam region 3 of projector 1 and may, in this manner, project an image 10 on a surface 2. Through appropriate control of the micromirrors, the laser scanner sights positions of image 10 irrespective of whether or not a laser beam is actually emitted. Therefore, at each instant, the part of the image 10 that projector 1 is projecting at this instant is known. In this case, the word "projects" does not necessarily mean that a light beam is emitted, but that a light beam would be thrown on the corresponding part of image 10 if light were to be emitted at the corresponding instant according to the image display to be represented using image 10. If, for example, a very dark image display is projected onto a surface 2 at a particular time, the laser scanner does scan all of the positions of image 10, but light beams are only emitted in comparatively few cases.

If a light intensity is measured S01 at time t0, the information about the part of the image 10 projected by projector 1 at time t0 is used for assigning the measured light intensity to the position of this part of the image. In this context, such assigning of light intensities to positions may be carried out for positions spaced apart from one another as closely as the laser scanner is able to resolve. One position may correspond to, and therefore, a light intensity may be assigned to, each pixel that the laser scanner projects. However, a measurement may also be made, for example, in only every fifth pixel projected by the laser scanner, which means that only every fifth position of image 10 is assigned a light intensity.

For the positions between the positions that are assigned light intensities, an interpolation of the light intensities may be carried out, after which the interpolated light intensities are assigned to positions, which are situated between the positions that were assigned measured light intensities. Light intensities may also be measured over a longer time interval, and the light intensities measured in the time interval may be summed up. The summed-up light intensity measured in this manner may then be jointly assigned to all positions, onto which the laser scanner projected in the corresponding time interval. It may be possible for a user to change the accuracy of the light intensity measurements, for example, as a function of a distance d3 of the surface 2 from projector 1, which surface is supposed to be projected onto. When distance d3 between projector (1; 101) and surface 2 is very short, the user may stipulate, for example, that an intensity measurement S02 be made during the projection of each individual pixel by the laser scanner.

According to the first specific embodiment, the measuring S02 and the assigning S03 of the measured light intensities are only carried out, in each instance, at times t0', at which the positions that are assigned S03 the measured intensities are situated on the projected image in a horizontal and/or vertical image margin 14 of projected image 10. In other words, based on the provided information regarding which part of image 10 the projector 1 projects at time t0', it is decided whether light intensities should be measured S02 at time t0'. If, at time t0', projector 1 projects a pixel, which is situated in a horizontal and/or vertical image margin 14, the measuring S02 of the measured light intensity and the assigning S03 of the light intensity to the corresponding position are carried out. If the measuring is not carried out, then the corresponding assigning S03 is also not carried out. Limiting the measuring S02 to an image margin 14 of projected image 10 may considerably reduce the computing expenditure and the required storage volume for the method of the present invention. In this context, a strip having a width between 1 and 100 pixels, preferably, between 1 and 10 pixels, and particularly preferably, having a width of 1 or 2 pixels, may be referred to as an image margin. A predefined test pattern, which may simplify the measuring of light intensities, may be projected on horizontal and/or vertical image margin 14. In particular, a horizontal and/or vertical image margin having a uniform color or an infrared light pattern may be used as a test pattern. If the projector projects unchanged image displays at the horizontal and/or vertical image margin, measured light intensities may be corrected by the light intensity of the image content.

In a method step S04, at a first time t1, a first light intensity function 7a, 7b is generated over a second plurality of positions, which are assigned light intensities. If, for example, only positions that are situated on a horizontal or vertical image margin 14 of image 10 are assigned light intensities, then the first light intensity function is also only generated as a function of positions, which are situated at corresponding image margin 14. The generating S04 of light intensity functions 7a, 7b may be based on a multitude of light intensities measured previously. Advantageously, measurements of light intensities, which are made between two times at which light intensity functions 7a, 7b are generated, are only used for generating a light intensity function 7a, 7b, in each instance, at the first subsequent time at which a light intensity function 7a, 7b is generated. Light intensity functions 7a, 7b are advantageously generated over positions, which, for each light intensity function 7a, 7b, are situated, in each instance, along a line in the plane of image 10.

In the following, the method according to the first specific embodiment is described in light of light intensity functions 7a, 7b, which are generated over positions at lower horizontal image margin 14 of projected image 10. In this context, the measured light intensities of positions situated one above the other inside lower horizontal image margin 14 are added, and light intensity function 7a, 7b is defined as a function of an x-coordinate. The x-axis, along which x-coordinates are determined, is defined to be at the lower end of image 10, parallel to horizontal image margin 14, with the origin O at the lower left corner of image 10. The terms "horizontal" and "vertical" are to be understood with respect to the image 10 projected by projector 1, and not as absolute.

In addition, several light intensity functions 7a, 7b of positions inside of horizontal image margin 14 may be generated along lines parallel to and vertically offset from one another and used, for example, for plausibility considerations. If, for example, horizontal image margin 14 is a strip having a width of 2 pixels, a light intensity function 7a, 7b may be generated over a line, which includes the lowest horizontal row of pixels, and in addition, a light intensity function 7a, 7b may be generated over a line, which includes the second lowest horizontal row of pixels. If lower horizontal image margin 14 is more than 2 pixels wide, then light intensity functions 7a, 7b may be generated along every horizontal row of pixels of lower horizontal image margin 14; however, light intensity functions 7a, 7b may also only be generated along, for instance, every second or every third, etc., horizontal row of pixels. According to the x-coordinate of their position, light intensities, which are assigned to positions that lie between the horizontal rows of pixels at which light intensity functions 7a, 7b are generated, may be added to the light intensity at the same x-coordinate of the light intensity function 7a, 7b, which is generated over the horizontal row of pixels situated nearest to the position assigned to the light intensity.

Plausibility checks may be carried out, for example, in that a point having a particular x-coordinate xB is only determined to be a prominent point B, if in all of such, or in the majority of such, light intensity functions 7a, 7b, which are generated over lines of positions situated in parallel with each other, in each instance, a point essentially having x-coordinate xB or in close proximity to x-coordinate xB is also determined to be a prominent point.

According to the first specific embodiment of the present invention, first light intensity function 7a, 7b is generated S04 at time t1, which corresponds to a time at which projector 1 has just finished the complete scanning of image 10, and which is, at the same time, the time at which projector 1 begins anew with the scanning of image 10. If projector 1 is configured, for example, to scan, in constant repetition, from the upper left corner of image 10 to the lower right corner of image 10 in zig-zag lines, then the time t1, at which first light intensity function 7a, 7b is generated, is a time, at which projector 1 projects the lower right corner of image 10.

In a method step S05, at a second time t2, at least one second light intensity function 7a', 7a'', 7b' is generated over the second plurality of positions. In other words, several light intensity functions 7a, 7a', 7a'', 7b, 7b' are generated at different times t1, t2, but over substantially the same positions, in the example described here, over the x-axis.

According to the method of the first specific embodiment, time t2 is the next time after first time t1, at which projector 1 has finished the scanning of the entire image 10 once more. In addition, for example, further light intensity functions may be generated at other times, which also correspond to times, at which projector 1 has just finished the complete scanning of image 10. However, the times at which light intensity functions are generated may also be spaced closer together or further apart, or the light intensity functions may be generated at uneven intervals. Light intensity functions may also be generated as a function of an external influence.

In a method step S06, first light intensity function 7a, 7b is compared to second light intensity function 7a', 7a'', 7b'. In the following, in order to illustrate the first specific embodiment of the present invention, light intensity functions, which are generated over the x-coordinate, as described above, are compared. In other words, the light-intensity functions 7a, 7a', 7a'', 7b, 7b', which were each generated over the same positions, but at different times t1, t2, are compared. Method step S06 is explained below in further detail, with reference to FIG. 4.

In a method step S07, the gesture made is determined on the basis of the results of the comparison in method step S06.

Figure 2:
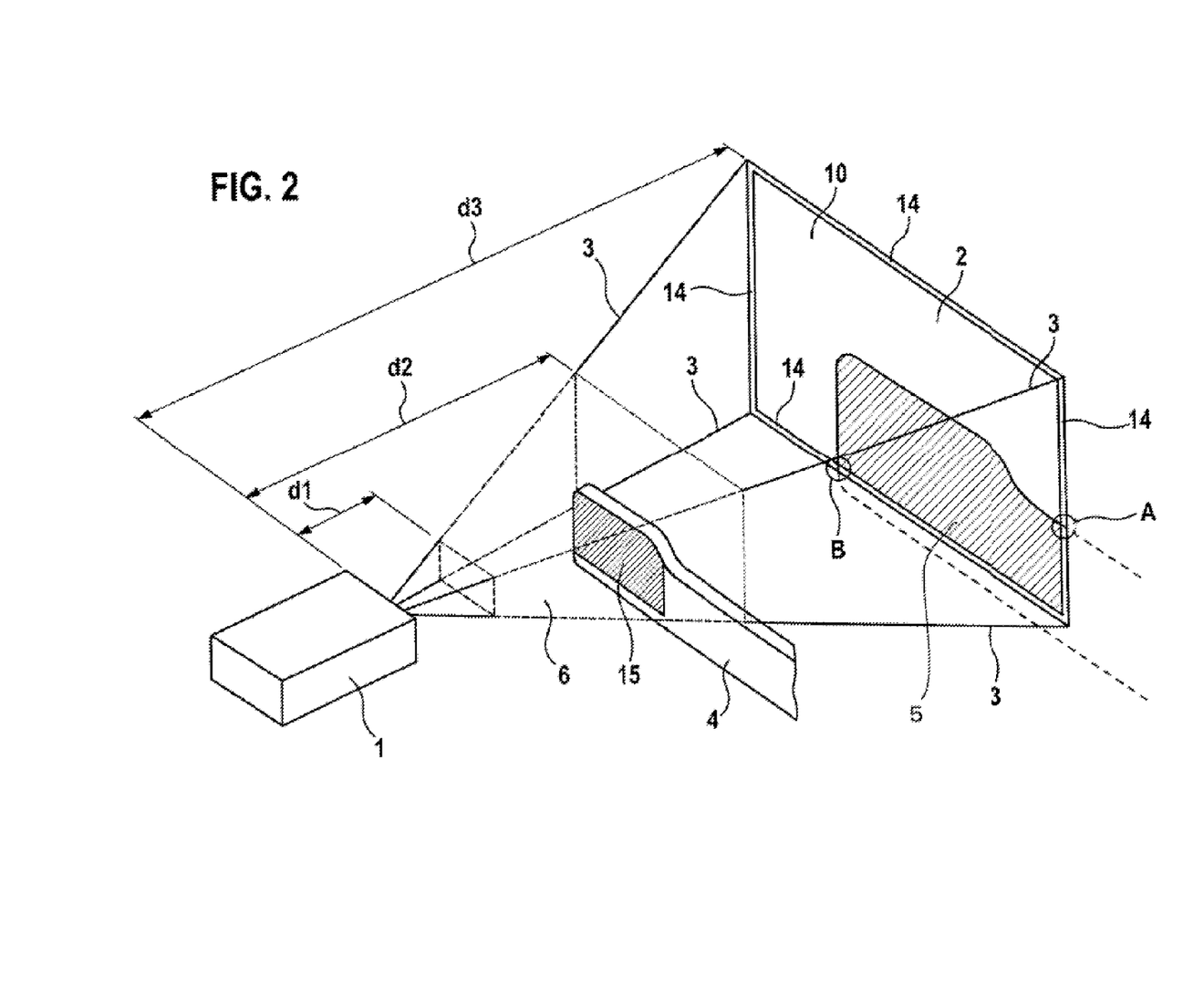
FIG. 2 shows a schematic side view of a set-up, with the aid of which the method according to the first specific embodiment of the present invention is carried out.

FIG. 2 shows a schematic side view of a set-up, with the aid of which the method according to the first specific embodiment of the present invention is carried out.

The distance between projector 1 and surface 2, into which image 10 is projected, is labeled d3. Beam region 3 of projector 1 spans the distance d3 between projector 1 and surface 2. Projected image 10 having horizontal and vertical edge regions 14 becomes visible where beam region 3 meets surface 2. According to the first specific embodiment, gestures are determined, in particular, in a detection region 6, a portion of beam region 3 which is situated between a first distance d1 and a second distance d2 from projector 1. At time t1, which is illustrated in FIG. 2, a human hand 4 is inserted into detection region 6. A portion 5 of surface 2 is shaded by it, and a portion 15 of image 10 is projected onto hand 4 instead of onto surface 2. Two prominent points A, B, which are explained below with reference to FIG. 3 and FIG. 4, are drawn into FIG. 2.

Figure 3:
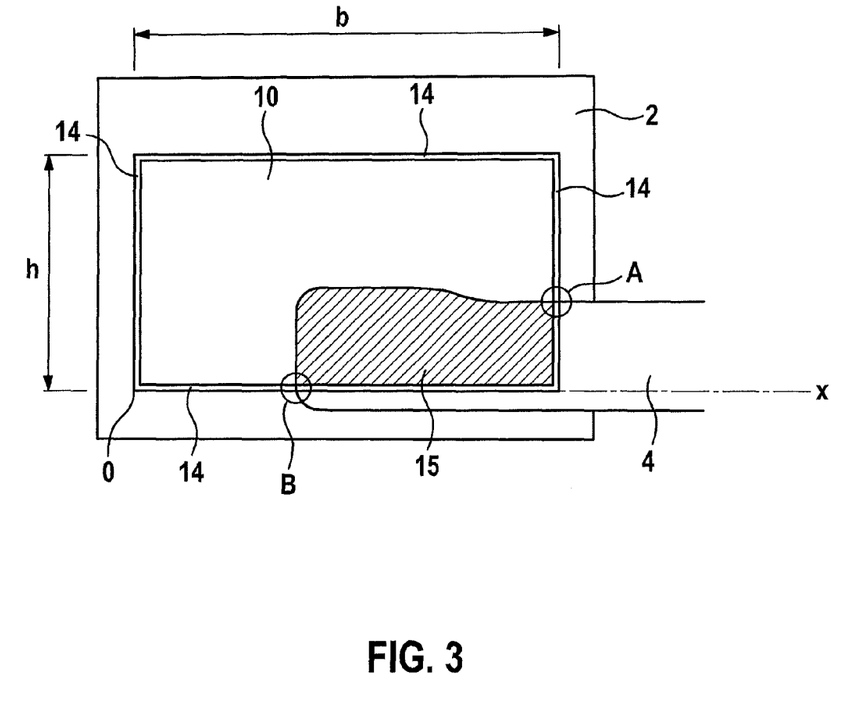
FIG. 3 shows a schematic front view from the point of view of the projector, in the direction of the surface, in order to clarify the method according to the first specific embodiment of the present invention.

FIG. 3 is a schematic front view from the point of view of projector 1, in the direction of surface 2, in order to clarify the method according to the first specific embodiment of the present invention.

FIG. 3 shows image 10, which has horizontal image margins 14, and of which part is projected onto surface 2 and part is projected onto hand 4. The part of image 10 projected onto hand 4 is denoted by 15. The x-axis, which includes the positions over which exemplary light intensity functions 7a, 7a', 7a", 7b, 7b' are generated, is drawn in at the lower edge of image 10. According to the first specific embodiment of the present invention, a prominent point B is determined. The measured light intensities differ markedly on the left and right of the designated, prominent point B in FIG. 3, since the reflecting characteristics of surface 2 differ markedly from the reflecting characteristics of hand 4. Since hand 4 is typically situated much closer to projector 1, from where the light intensities are measured, than to surface 2, the light intensities are typically higher at the positions along the x-axis that belong to the part 15 of image 10 projected onto hand 4, than the light intensities at positions along the x-axis that are situated at the part of image 10 projected onto surface 2. In the example described in light of FIG. 3, a prominent point A, at which light intensities markedly differ in the vertical direction along right, vertical image margin 14, is also defined at right, vertical image margin 14. To determine prominent point A, a light intensity function was generated along a line of positions, which are situated in right, vertical image margin 14. The width of image 10 is denoted by b, the height of image 10 is denoted by h.

Figure 4:
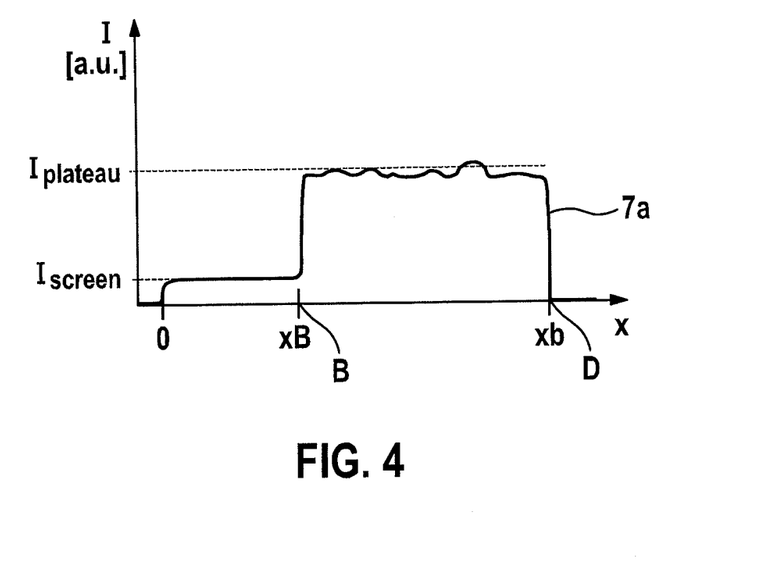
FIG. 4 shows the graph of a light intensity function, in order to clarify the method according to the first specific embodiment.

FIG. 4 shows the graph of a light intensity function 7a, in order to clarify the method according to the first specific embodiment.

On the vertical axis, the graph in FIG. 4 shows intensity I in arbitrary units "a.u." The horizontal axis shows x-axis, which is explained with reference to FIGS. 2 and 3 and is drawn into FIG. 3. Origin O corresponds to the lower left corner of image 10. The x-coordinate of prominent point B is denoted by xB, and the x-coordinate of right, vertical image margin 14 of image 10, which lies at a distance b from origin O, is denoted by xb. The function 7a drawn in, which was generated at time t1, corresponds to the light intensities along the x-axis resulting from inserting hand 4 into beam region 3, or more precisely, into detection region 6 of projector 1. Light having a low light intensity $I_{screen}$ is reflected by surface 2, light having higher light intensity $I_{plateau}$ is reflected by hand 4.

According to the first specific embodiment, prominent points A, B, C, and D in first light intensity function 7a, 7b are determined in a method step. In this context, points at which and/or in the vicinity of which the slope of the light intensity function exceeds a predefined upper slope threshold value or falls below a predefined lower slope threshold value, are determined to be prominent points A, B, C, D. In FIG. 4, the slope of light intensity function 7a exceeds the predefined upper slope threshold value at the prominent point B having x-coordinate xB, as well as the predefined lower slope threshold value at the prominent point D having x-coordinate xb. The upper slope threshold value and the lower slope threshold value may be preprogrammed, but may also be set by a user as a function of the given situation, for example, as a function of the lighting conditions. Due to its position, prominent point D may be associated with right image margin 14 of image 10.

Figure 5:
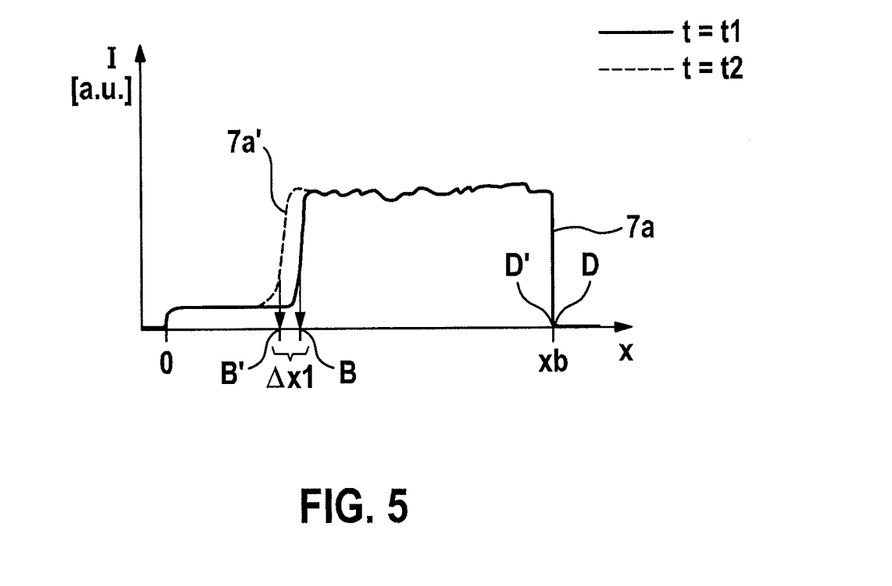
FIG. 5 shows two light intensity functions for explaining the method according to the first specific embodiment of the present invention.

FIG. 5 shows two light intensity functions 7a, 7a', in order to explain the method according to the first specific embodiment of the present invention.

FIG. 5 shows essentially the same elements as FIG. 4. Light intensity function 7a was generated over the positions of the x-coordinates at time t1. Light intensity function 7a' was generated over the same positions at time t2, which follows time t1. In the method step, prominent points B' and D' are determined in second light intensity function 7a'.

In one method step, prominent point B of first light intensity function 7a is associated with prominent point B' of second light intensity function 7a'. This may occur, for example, due to short distance Δx1 on the x-axis between prominent points B, B'. Further characteristics of prominent points B, B' may be used for checking the plausibility of the association. For example, a comparison may be made as to whether the two prominent points B, B' were determined such that in slopes of light intensity functions, they exceeded the upper slope threshold value. If this is not the case, the association of prominent points B, B' may not occur. Prominent point D of light intensity function 7a is associated with prominent point D' of light intensity function 7a'.

In one method step, gesture data may be generated on the basis of the prominent points B, B' associated with one another. In the case of the characteristic of light intensity functions 7a, 7a' shown in FIG. 5, a speed, at which hand 4 has moved in detection region 6 of beam region 3 in the time interval between first time t1 and second time t2, may be ascertained on the basis of distance Δx between the prominent points B, B' associated with one another and the time difference between known times t2, t1. In this case, the gesture data generated may include information about the position and/or the velocity of hand 4. In this context, information regarding the prominent points D, D' associated with one another may be disregarded, since they are connected with right image margin 14. Thus, for example, over a long period of time, a motion pattern of velocities of hand 4 may be generated, which corresponds, for example, to movement of the hand into, and subsequently out of, detection region 6. A gesture may be determined from this.

Figure 6:
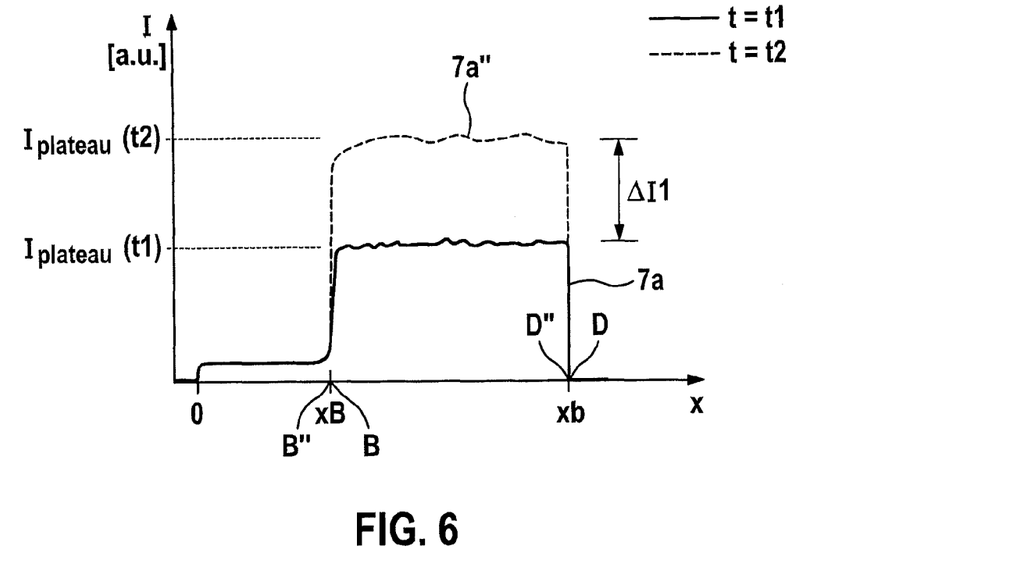
FIG. 6 shows two light intensity functions for explaining the method according to the first specific embodiment of the present invention.

FIG. 6 shows two light intensity functions 7a, 7a", in order to explain the method according to the first specific embodiment of the present invention.

In FIG. 6, a prominent point B" having x-coordinate xB and a prominent point D" having x-coordinate xb were determined in light intensity function 7a", which was generated at time t2. Prominent points B and B" were associated with one another, and prominent points D and D" were associated with one another. Between the prominent point B having x-coordinate xB and prominent point D having x-coordinate xb, the light intensity function 7a generated at time t1 has a substantially constant light intensity $I_{plateau}(t1)$. Between the prominent point B" having x-coordinate xB and the prominent point D" having x-coordinate xb, the light intensity function 7a" generated at time t2 has a substantially constant light intensity $I_{plateau}(t2)$, which differs from $I_{plateau}(t1)$ by light intensity difference ΔI1. In this case, gesture data may include information about the light intensity difference ΔI1 per time interval. From the x-coordinates of the prominent points B, B', which x-coordinates are substantially constant between times t1 and t2, and which prominent points are associated with one another; and from the light intensity between xB and xb, which increases in the same time interval and is substantially constant spatially; it may be concluded that hand 4 was moved substantially towards projector 1; 101, away from the direction of surface 2.

A gesture or a part of a gesture may be determined from this. For example, consecutively inserting hand 4 into detection region 6 from the right image margin, moving hand 4 in the direction of the left image margin, as illustrated by FIG. 5, and moving hand 4 in the direction of projector 1; 101, as illustrated by FIG. 6, may be interpreted as a gesture.

Figure 7:
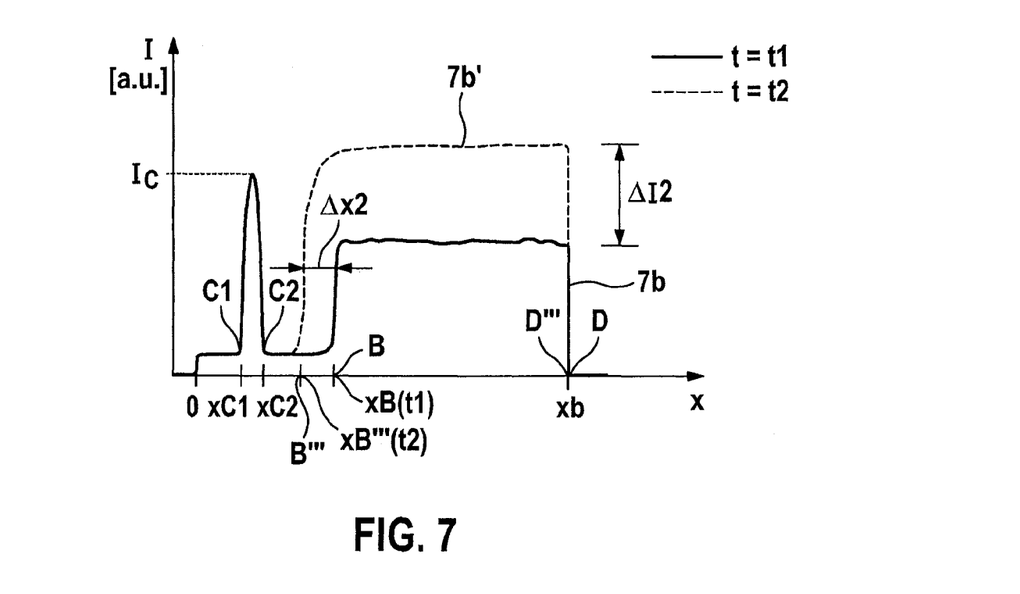
FIG. 7 shows two light intensity functions for explaining the method according to the first specific embodiment of the present invention.

FIG. 7 shows two light intensity functions 7b, 7b', in order to explain the method according to the first specific embodiment of the present invention.

FIG. 7 shows a first light intensity function 7b, which was generated at time t1, as well as a second light intensity function 7b', which was generated at time t2. Prominent point D of light intensity function 7b is associated with a prominent point D" of light intensity function 7b'. Prominent point B having x-coordinate xB(t1) in light intensity function 7b at time t1 is associated with a prominent point B''' having x-coordinate xB'''(t2) in light intensity function 7b' at time t2. From the difference Δx2 on the x-axis between xB(t1) and xB'''(t2), a movement of hand 4 in the direction of origin O on the x-axis is concluded, as explained in further detail in light of FIG. 5. From the light intensity difference ΔI2 between the plateaus of substantially constant light intensity for xb>x>xB (t1) and xb>x>xB''(t2), an additional movement of hand 4 in the direction of projector 1; 101 is concluded, as explained in further detail in light of FIG. 6.

In addition, two prominent points, C1 having x-coordinate xC1, and C2 having x-coordinate xC2, are drawn into FIG. 7. The intensity peak between xC1 and xC2 may be caused, for example, by a shiny metallic object.

In the method according to the first specific embodiment, the evaluation of light intensity functions 7a, 7a', 7a", 7b, 7b' explained with the aid of FIGS. 4 through 7 is carried out analogously along the three additional edge regions. Thus, movements in the vertical and horizontal directions, but also diagonally across image 10 or towards projector 1 or away from projector 1 may be determined.

Figure 8:
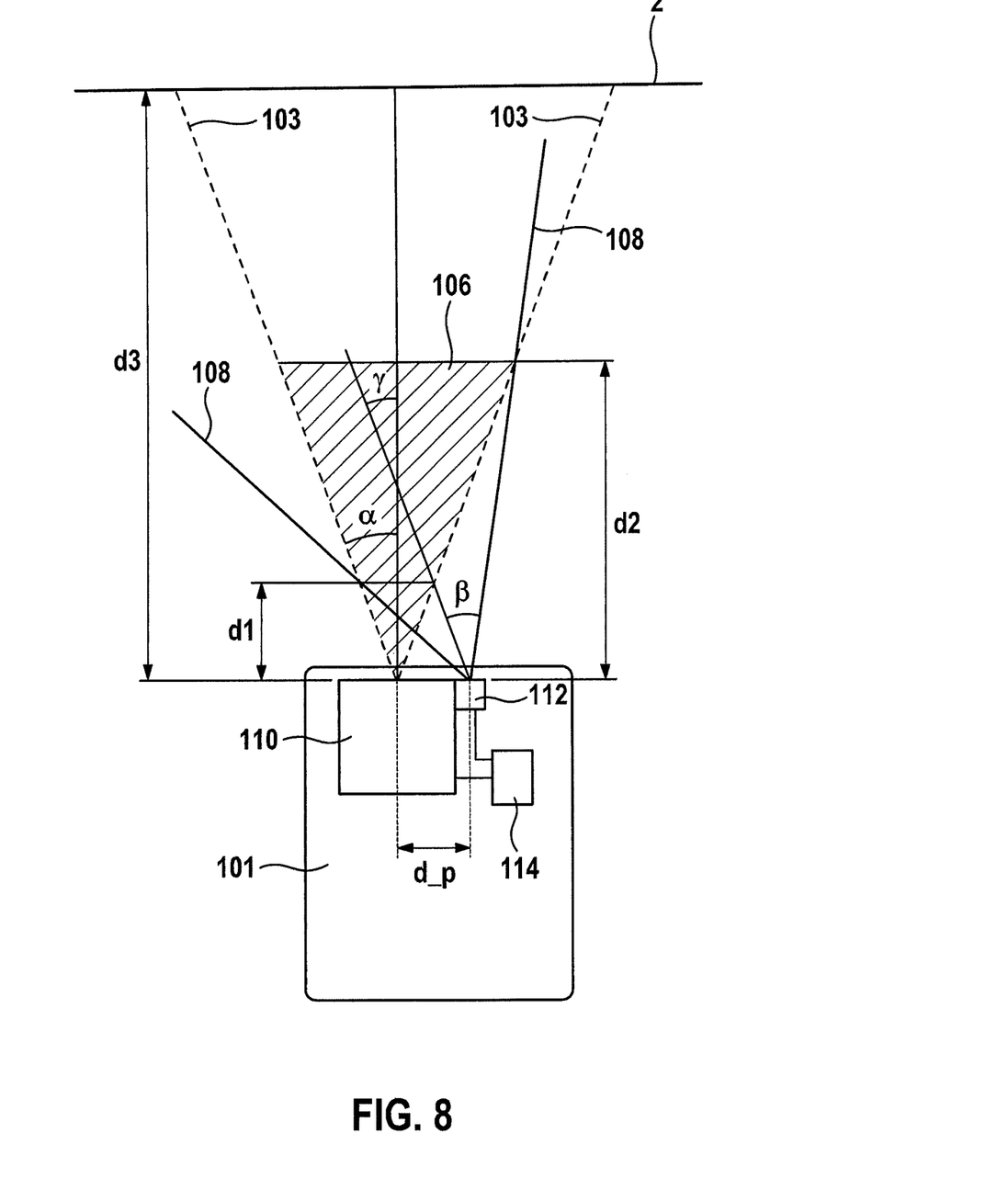
FIG. 8 shows a schematic plan view of a specific embodiment of a device according to the present invention.

FIG. 8 shows a schematic plan view of a specific embodiment of a device according to the present invention.

In FIG. 8, projector 101 takes the form of a cellular phone 101 having a laser scanner 110 as a projector device 110 and further includes a detector 112 and a computing device 114. Computing device 114 is connected to detector 112 and is configured to assign S03 the measured light intensities to, in each instance, a position on the image 10 projected by projector 1; 101; to generate S03, S04 light intensity functions 7a, 7a', 7a", 7b, 7b' over positions which are assigned measured light intensities; to compare S06 generated light intensity functions to each other; and to determine S07 a gesture made, based on the result of the comparison S06. In this context, as shown in FIG. 8, computing device 114 may be situated in the same housing as laser scanner 110 and/or detector 112, but may also be separately positioned. Detector 112 is configured to measure S02 light intensities of backscattered light from the direction of a surface 2, onto which projector 101 projects S01 an image 10, under the influence of a gesture made in beam region 3 of projector 101 with the aid of an object 4. In the specific embodiment shown in FIG. 8, detector 112 takes the form of a photodiode 112. Computing device 114 may be connected to laser scanner 110 and configured to receive information from it regarding, at which time laser scanner 110 projects which position of image 10. Accordingly, computing device 114 may force detector 112 to take light intensity measurements, for example, when laser scanner 110 projects a position of image 10, which is situated in a horizontal and/or vertical edge region 14 of image 10.

Detector 112 and laser scanner 110 are situated at a distance dp relative to one another and configured in such a manner, that detection range 108 of detector 112 and beam region 103 of projector 101 each include detection region 106. The detection range 108 of the detector having acceptance angle 2β is tilted by the angle γ with respect to beam region 103 of the projector 101 having acceptance angle 2α. Consequently, every gesture may be measured precisely in at least detection range 108.

Figure 9:
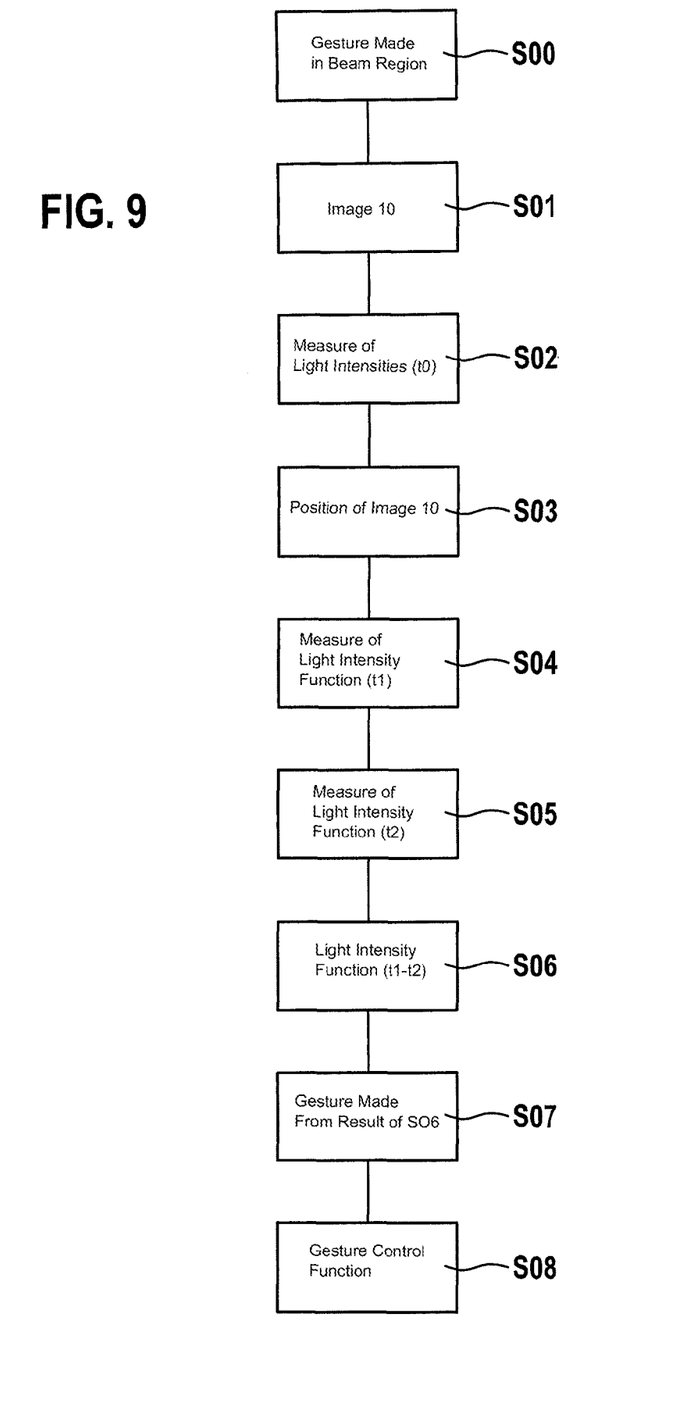
FIG. 9 shows a flow chart for explaining a method according to a second specific embodiment of the present invention.

FIG. 9 shows a flow chart for explaining a method according to a second specific embodiment of the present invention.

The method according to the second specific embodiment has substantially the same steps as the method according to the first specific embodiment, which is illustrated in FIG. 1. In addition, the method according to the second specific embodiment includes a method step S00, in which a gesture is made in beam region 3; 103 of projector 1; 101 in order to control the projector, as well as a method step S08, in which projector 1; 101 is controlled with the aid of the determined, made gesture.

Although the present invention was described above in terms of preferred exemplary embodiments, it is not limited to them, but rather is modifiable in numerous ways. In particular, the present invention may be changed or modified in various ways without deviating from the essence of the present invention.

What is claimed is:

1. A method for determining a gesture made in a beam region of a projector, comprising:
   projecting, by a light projector, an image towards a projection surface by emission of a beam;
   at a first point in time, measuring a first set of light intensities of light backscattered due to the emission of the beam and in a direction from the projection surface towards the light projector;
   assigning each of the measured first set of light intensities to a respective position of the image projected by the light projector; and
   generating a first light intensity function over at least a subset of the positions of the image based on the assignment of the measured first set of light intensities;
   at a second time point, measuring a second set of light intensities of light backscattered due to the emission of the beam and in the direction from the projection surface towards the light projector;
   assigning each of the measured second set of light intensities to a respective position of the image projected by the light projector; and
   generating a second light intensity function over at least a subset of the positions of the image based on the assignment of the measured second set of light intensities;
   comparing the first light intensity function to the second light intensity function; and
   determining a gesture made in a region of the beam between the light projector and the projection surface based on a result of the comparison between the first and second light intensity functions.

2. The method as recited in claim 1, wherein the assigning of the measured first set of light intensities and the assigning of the measured second set of the light intensities is carried out based on an identified respective specific part of the image the projector has projected at the first and second points in time, from which the subsets of the positions of the image are selected.

3. The method as recited in claim 2, wherein the measuring of the first set of light intensities and the assigning of the measured first set of light intensities are only carried out if the positions which are assigned the measured intensities are situated in at least one of (i) a predefined horizontal, peripheral image margin of the projected image, and (ii) a predefined vertical, peripheral image margin of the projected image.

4. The method as recited in claim 3, wherein the at least one of the predefined horizontal, peripheral image margin and the predefined vertical, peripheral image margin is between one and ten pixels wide.

5. The method as recited in claim 3, wherein a predefined test pattern having one of a uniform color or infrared light is projected in the at least one of the predefined horizontal, peripheral image margin and the predefined, peripheral image margin.

6. The method as recited in claim 3, wherein the determination of the gesture includes:
 determining prominent points in the first light intensity function and prominent points in the second light intensity function;
 associating at least one prominent point in the first light intensity function with a prominent point in the second light intensity function; and
 generating gesture data which include at least one of (i) information about spatial positions of the prominent points associated with one another, and (ii) a change in an average value of the light intensity between the prominent points.

7. The method as recited in claim 6, wherein points in the first and second light intensity functions, in a vicinity of which points a slope of the respective light intensity function exceeds a predefined upper slope threshold value or falls below a predefined lower slope threshold value, are determined to be the prominent points.

8. The method as recited in claim 3, wherein the gesture is made by a human hand.

9. The method as recited in claim 8, wherein the gesture is made in the beam region of the projector in order to control the projector, and wherein the projector is controlled in accordance with the determined gesture.

10. The method as recited in claim 9, wherein the gesture is made in a space between a first distance d1 from the projector and a second distance d2 from the projector, the second distance d2 being greater than the first distance d1, and the second distance d2 being less than 75% of a third distance d3 between the projector and the projection surface, and wherein the first distance d1 is in a range between 5 cm and 25 cm, and wherein the second distance d2 is in a range between 30 cm and 100 cm.

11. A device for determining a gesture made in a beam region of a projector, comprising:
 a light projector device for projecting an image towards a projection surface by emission of a beam;
 a detector configured to:
  at a first point in time, measure a first set of light intensities of light backscattered due to the emission of the beam and in a direction from the projection surface towards the light projector; and
  at a second point in time, measure a second set of light intensities of light backscattered due to the emission of the beam and in the direction from the projection surface towards the light projector; and
 a computing device including a processor, wherein the computing device is connected to the detector and configured to:
  assign each of the measured first set of light intensities and each of the measured second set of light intensities to a respective position of the image projected by the light projector;
  generate a first light intensity function over at least a subset of the positions of the image based on the assignment of the measured first set of light intensities;
  generate a second light intensity function over at least a subset of the positions of the image based on the assignment of the measured second set of light intensities;
  compare the first light intensity function to the second light intensity function; and
  determine a gesture made in a region of the beam between the light projector and the projection surface based on a result of the comparison between the first and second light intensity functions.

12. The device as recited in claim 11, wherein the detector and the projector device are integrated in a common housing.

13. The device as recited in claim 12, wherein the projector device is configured as a laser scanner.

14. The device as recited in claim 12, wherein the projector device is configured as one of a cellular phone or a tablet PC.

* * * * *